Dec. 11, 1934.　　H. M. ROCKWELL　　1,983,947
ROD END JOINT
Filed April 9, 1930　　2 Sheets-Sheet 1

INVENTOR
Hugh M. Rockwell
BY
Kenyon & Kenyon
ATTORNEYS

Dec. 11, 1934.  H. M. ROCKWELL  1,983,947
ROD END JOINT
Filed April 9, 1930  2 Sheets-Sheet 2
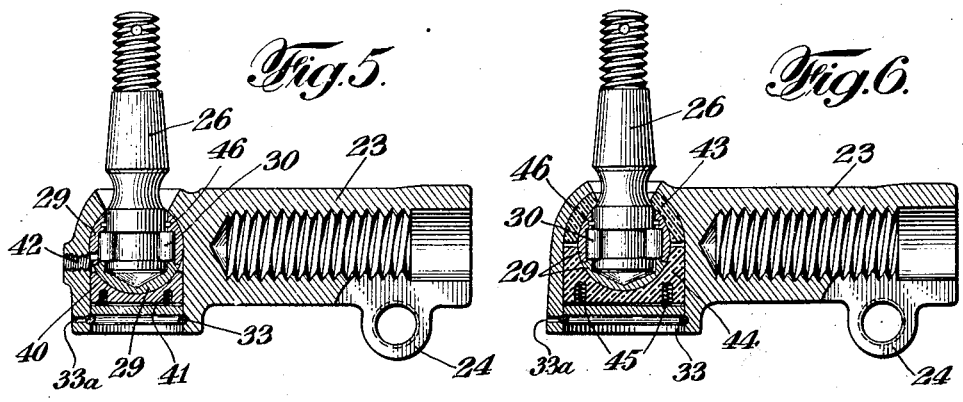
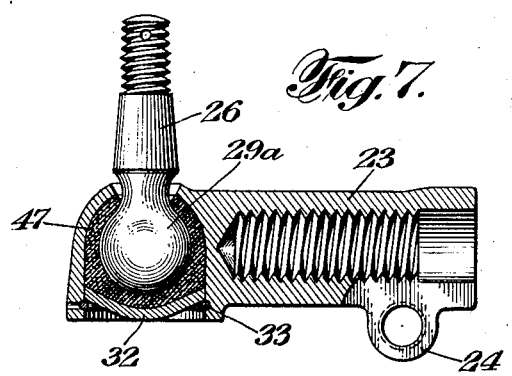
INVENTOR
*Hugh M. Rockwell*
BY
*Kenyon & Kenyon*
ATTORNEYS Patented Dec. 11, 1934

1,983,947

UNITED STATES PATENT OFFICE 1,983,947

ROD END JOINT

Hugh M. Rockwell, Freeport, N. Y.

Application April 9, 1930, Serial No. 442,813

7 Claims. (Cl. 287—90)

This invention relates to rod end joints and has for an object a novel and improved joint of this type, particularly adapted to connect a pull member to the end of a swinging arm.

In a rod end joint embodying the present invention, friction is substantially eliminated and, in certain embodiments of the joint, lubrication, after the joint has been assembled, is rendered unnecessary. Friction is substantially eliminated by utilizing a ball which is mounted on a stem by means of anti-friction rollers and lubrication is rendered unnecessary by introducing a liner of self-lubricating or resilient material between the surfaces of the ball and socket. Such a joint is of particular utility in the steering gear of an automobile for connecting the ends of the drag link to the steering arm and the steering knuckle carried by one of the front wheel trunnions and also for connecting the ends of the tie rod with arms carried by the front wheel trunnions.

Other objects, novel features and advantages of this invention will be apparent from the following specification and accompanying drawings, wherein:

Figs. 5, 6 and 7 are sections through modifications.

Fig. 8 is a plan view of a drag link equipped with joints embodying the invention, and Fig. 9 is a similar view of a tie rod equipped with joints embodying the invention.

Figure 1:
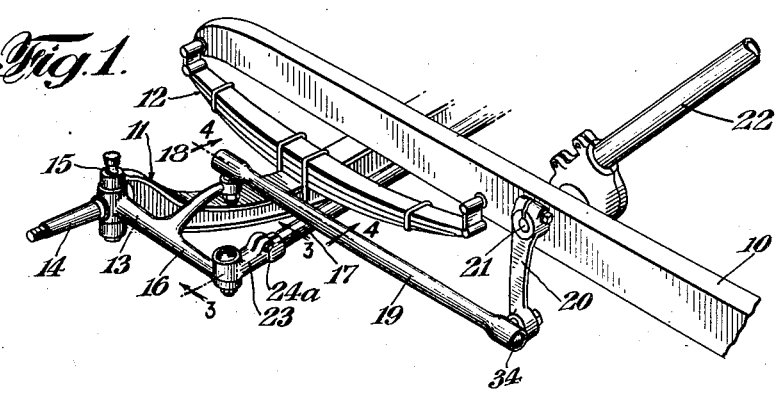
Fig. 1 is a fragmentary perspective view of the steering mechanism of an automobile.
Figure 2:
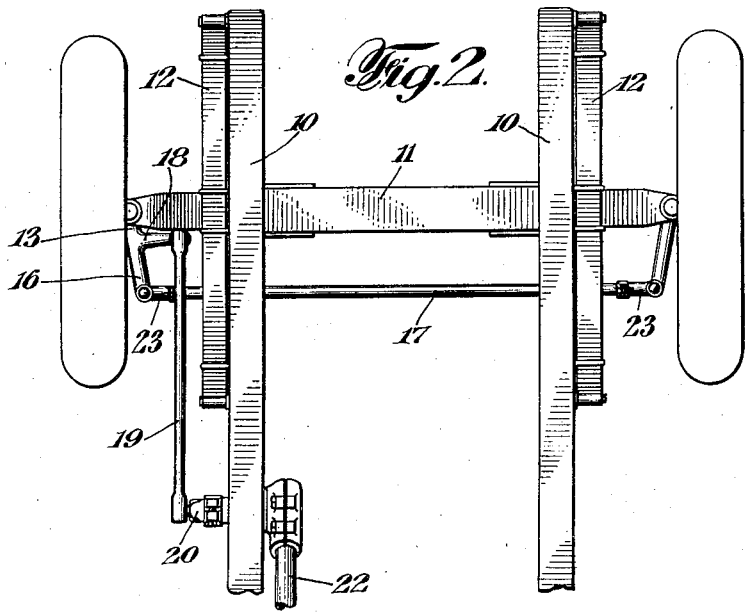
Fig. 2 is a fragmentary plan view of such mechanism.

In Figs. 1 and 2, 10 indicates the frame of an automobile and 11 indicates the front axle from which the frame is supported by springs 12. At each end of the axle 11 there is provided the usual trunnion 13 from which extends the wheel spindle 14, each trunnion being connected to the axle in the usual manner through the medium of a king pin 15. An arm 16 extends horizontally from each trunnion 13 and these arms are connected by a tie rod 17. The left wheel trunnion is provided with a steering knuckle 18, which is connected by a drag link 19 with the steering arm 20 carried by a shaft 21 which is suitably geared to the steering column 22 so that rotation of the steering column causes swinging movement of the steering arm in a vertical plane. The swinging of the steering arm 20 effects turning of the left trunnion 13 on the king pin in the well-known manner and the right trunnion is caused to swing correspondingly by reason of its being connected through the tie bar 17.

The tie bar 17 is provided at one end with right hand threads and at the other end with left hand threads and a connector 23 is screwed on to each end of the tie bar. These connectors are split longitudinally and are provided with lugs 24 through each of which passes a bolt 24a. By means of the bolts 24a, the connectors may be clamped to the tie bar to prevent rotation of the latter. However, when the bolts 24a are loosened the rod 17 may be rotated for adjustment purposes. Each connector is provided with a transverse socket 25 having an opening at one end of greater diameter than the opening at the other end. A stem 26 extends into a recess in the steering knuckle 16 and is held fast to the arm 16 by a nut 27. The stem 26 projects into the socket 25 through the smaller opening and is provided with a raceway 28. A two-part head or ball 29 has a recess into which the stem 26 extends and one part is provided with a raceway opposite the raceway 28. Anti-friction rollers 30 are arranged in the raceways and support the ball 29 on the stem 26. The two sections of the ball 29 meet along the edge of the raceway 28, thus permitting assembly of the ball on the stem. A substantially spherical liner 31 surrounds the ball 29 and tends to hold together the two parts thereof. A cap 32 of spherical configuration rests on the liner 31 and is held in place by a snap ring 33. The liner 31 may be composed of rubber or other flexible or yielding material.

Figure 4:
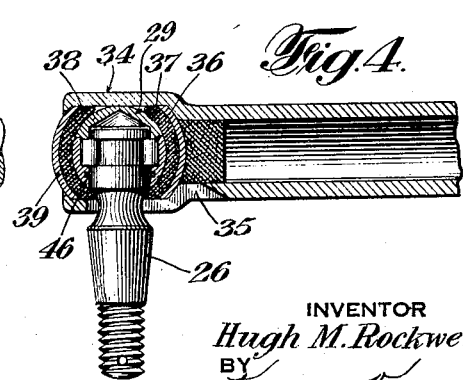
Fig. 4 is a section taken on the line 4—4 of Fig. 1.

The drag link 19 is tubular and is provided at each end with a socket 34. A lateral slot 35 is provided in the wall of the socket 34, thereby permitting the insertion of the stem 26 through the end of the socket. After the stem has been inserted, a curved plate 36 and a correspondingly shaped liner 37 are arranged as shown in Fig. 4, after which a similar liner 38 and a similar plate 39 are arranged as shown and the edge of the socket spun over to complete the assembly. The plates 36 and 39 are composed of metal and the liners 37 and 38 are composed of resilient or other yielding material. The liners above described are preferably formed of rubber of the type which has been used in spring shackles.

The roller bearings insure free rotational movement between the socket member and the stem about the stem axis, which is the major movement that takes place. The minor movement of the stem relative to the socket is about axes perpendicular to the aforementioned axis and is effected by the yielding of the rubber liner.

This last mentioned movement is very slight and subjects the rubber liner to very slight strain. The rubber lining tends to hold the stem in a central position and to return it to such position after it has been moved therefor.

Figure 3:
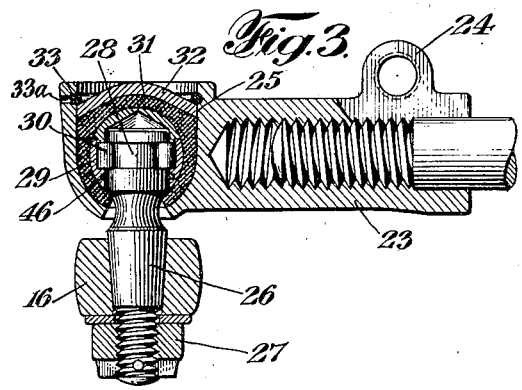
Fig. 3 is a section taken on the line 3—3 of Fig. 1.

The arrangement disclosed in Fig. 3 may be used wherever it may be necessary to effect adjustments while the modification disclosed in Fig. 4 is adapted for use where no adjustments are needed. The tie bar has been shown as equipped with the arrangement disclosed in Fig. 3 and the drag link as equipped with the arrangement disclosed in Fig. 4. It is, of course, apparent that the drag link also might be made in accordance with the disclosure in Fig. 4, if adjustability is required.

In the modification disclosed in Fig. 5, the liner is dispensed with and the surface of the ball directly engages the surface of the socket. In this modification, a metal follower 40 is interposed between the cap and the ball. Springs 41 are provided for holding the follower in contact with the ball and serve to compensate for wear. In this modification a port 42 is provided for injecting lubricant into the joint and the head is provided with a port through which lubricant may pass to the anti-friction members.

In Fig. 6, the liner 43 is formed of self-lubricating material and the follower 44 is likewise composed of such material. In this modification, the follower is pressed against the ball by means of springs 45, thereby compensating for wear.

In each of the modifications disclosed in Figs. 3, 4 5 and 6, a notch is provided in the ball in which is mounted a dust guard 46 which prevents dirt from getting in between the anti-friction rollers and in Figs. 3, 5, 6 and 7 apertures 33a are provided to permit the application of pressure to force out the snap ring 33.

In the modification disclosed in Fig. 7, the ball 29a is integral with the stem 26 and is surrounded by a liner 46 of rubber or other resilient material. Movement of the stem 26 relative to the socket is permitted by the yielding of the liner 47. Also the rubber liner tends to maintain the stem in a central position. While the head 29 preferably is spherical in shape, it may, where a rubber liner is used, be of any other shape which will permit movement of the head in the socket. Also, instead of using anti-friction bearing members between the stem and the head, the ball and stem may be provided with contacting bearing surfaces. The joint above described may be put to a great many different uses in addition to the use specifically disclosed and described. It may be used in connection with various control rods, shock absorber links, etc. Where anti-friction bearings are used, such bearings preferably are packed with lubricant when being assembled with the ball and stem.

It is of course understood that various changes may be made in the structure above described, without in any way departing from the spirit of the invention as defined in the appended claims.

I claim:

1. A rod joint for steering gear of automobiles and the like comprising in combination a socket member, a stem extending into said socket member, a resilient cushioning liner of flowable material within the socket member, a bearing in which said stem is rotatably secured, interposed between the stem and the resilient liner, and anti-friction elements disposed between the stem and the bearing.

2. A joint of the class described comprising, in combination, a cup-shaped socket member having an opening in one side, a stem extending through said opening, a head entirely enclosed within said socket and having a recess to receive said stem, opposed raceways in said head and stem, anti-friction bearing members arranged in said raceways, a resilient liner for the socket member and a cap for retaining said head in said socket.

3. A joint of the class described comprising, in combination, a connecting member having a transverse socket terminating in apertures of different diameters, a ball in said socket of larger diameter than the small aperture, a stem passing through the smaller aperture and extending into a recess in said ball, said stem being capable of limited movement in all radial directions, opposed raceways in said ball and stem, anti-friction rollers arranged in said raceways, a resilient liner for the socket member and a cap for retaining said ball in said socket.

4. A joint of the class described comprising, in combination, a movable member having an integrally formed socket in its end, a stem extending laterally through an apertured wall of said member and into said socket, a head mounted on the inner end of said stem for rotation about the axis thereof, said socket completely enclosing said head, a resilient liner of flowable material interposed between said head and the wall of the socket completely filling all the space therebetween whereby to permit self-centering but limited universal movement of said head and stem and a bearing for the head interposed between the stem and the head.

5. A joint of the class described comprising, in combination, a member having a socket, a stem extending into said socket, a head mounted on and enclosing the end of said stem for rotation about the axis thereof, a resilient liner of flowable material interposed between the whole of said head and the wall of said socket for limited universal movement of said head, and anti-friction members interposed between said stem and said head.

6. A joint of the class described comprising, in combination, a member having a socket, a two-part ball having a blind opening arranged within said socket, a stem extending into the opening of said ball and projecting through an aperture in the socket wall, anti-friction rollers interposed between said stem and the ball, and a resilient liner surrounding said ball and contacting with the wall of said socket.

7. A rod joint comprising in combination a pair of members disposed at an angle to each other and relatively rotatable, one member having a socket and the other member having a stem with the stem disposed within the socket, a bearing member surrounding the stem, and a resilient cushioning member of flowable material disposed within the socket and interposed between the member and the socket, constructed and arranged for automatically centering the stem relative to the socket and permitting a rocking movement of the stem relative to the socket.

HUGH M. ROCKWELL.